United States Patent [19]

Wegmann

[11] Patent Number: 4,821,460

[45] Date of Patent: Apr. 18, 1989

[54] ARRANGEMENT FOR CONTROLLING THE SPEED OF ADVANCE OF A TOOL TOWARD A WORKPIECE

[75] Inventor: Heinz Wegmann, Rümlang, Switzerland

[73] Assignee: Meseltron S.A., Corcelles, Switzerland

[21] Appl. No.: 56,829

[22] Filed: Jun. 2, 1987

[30] Foreign Application Priority Data

Jun. 11, 1986 [FR] France ............................ 86 08534

[51] Int. Cl.⁴ ............................................. B24B 49/00
[52] U.S. Cl. .............................. 51/165.92; 51/165.77; 409/141; 409/186; 73/660; 82/904
[58] Field of Search .......... 51/165.92, 165.77, 165.93, 51/134.5, 165 R; 409/141, 186; 82/DIG. 9; 83/72; 73/654, 660, 661; 248/638

[56] References Cited

U.S. PATENT DOCUMENTS

| | | | |
|---|---|---|---|
| 2,866,301 | 12/1958 | Koulicovitch et al. | 73/66 X |
| 3,095,532 | 6/1903 | Floyd | 82/DIG. 9 |
| 3,207,014 | 9/1965 | Carlstedt | 409/141 |
| 3,494,180 | 2/1970 | Hansel | 73/660 X |
| 4,575,970 | 3/1986 | Kozai et al. | 51/165.92 |
| 4,637,169 | 1/1987 | Sigg | 51/165.77 |
| 4,648,579 | 3/1987 | Wilson | 248/638 |
| 4,656,868 | 4/1987 | Azuma et al. | 73/587 |

FOREIGN PATENT DOCUMENTS

| | | | |
|---|---|---|---|
| 0143224 | 8/1980 | Fed. Rep. of Germany | 409/141 |
| 2287679 | 10/1974 | France | 469/64 |
| 2306791 | 4/1975 | France | 51/165 R |
| 5245121 | 11/1978 | Japan | 73/654 |
| 60-213477 | 10/1985 | Japan | 51/165.77 |
| 0715940 | 2/1980 | U.S.S.R. | 51/165.77 |

Primary Examiner—Frederick R. Schmidt
Assistant Examiner—Shirish Desai
Attorney, Agent, or Firm—Griffin, Branigan & Butler

[57] ABSTRACT

The arrangement enables controlling the speed of advance of the tool part of a machine tool during its approach phase toward a workpiece and reducing such speed as soon as the tool contacts the workpiece.

It includes an acoustic sensor adapted to detect the signal emitted at the instant of contact, an electronic circuit for processing such signal and a motor responding to the circuit to regulate the speed of advance of the tool part. The sensor is fastened to a feeler mounted on the machine framework by means of shock absorbers, said feeler being arranged to be in contact with the workpiece or its carrier.

6 Claims, 2 Drawing Sheets

ARRANGEMENT FOR CONTROLLING THE SPEED OF ADVANCE OF A TOOL TOWARD A WORKPIECE

FIELD OF THE INVENTION

This invention concerns an arrangement for controlling the speed of advance of the tool part of a machine tool during its approach phase toward a workpiece and for reducing said speed as soon as the tool part has come into contact with the workpiece comprising an acoustic sensor adapted to detect the signal emitted at the instant of said contact, an electronic circuit for processing said signal and a motor responding to the circuit so as to regulate the speed of advance of said tool part.

BACKGROUND OF THE INVENTION

As a general rule, the approach of the tool towards the workpiece in machine tools is effected at a relatively high speed in order to reduce as much as possible the dead time of the machine. However, when the tool comes into contact with the workpiece, it is desirable to reduce very rapidly such high speed of advance in order to avoid deterioration as much in the tool itself as in the workpiece.

There have long been known arrangements, employed particularly in grinders or truers, which include an acoustic sensor, preferably of the piezo-electric type, intended to detect an acoustic emission which is generated when the grinder comes into contact with the workpiece, the signal thus obtained being employed following amplification thereof to reduce, if necessary to zero, the relatively high speed employed during the approach phase.

Such an arrangement is described for instance in Swiss Pat. No. 585,609 where the sensor is fixed to the framework of the machine or, more exactly, on the carrier of the workpiece.

A similar arrangement is found in French Pat. No. 2,382,310. Here a vibration sensor is mounted on the workpiece support in a machine of the centerless type.

At the same time, the known arrangements exhibit a difficulty which consists in that the inherent noise generated by the tool when it comes into contact with the workpiece, is scarcely different in intensity and in frequency from the ambient noises produced by the machine, for example the noises of the bearings, gears, pneumatic or hydraulic driving elements, etc. to such an extent that satisfactory operation of the arrangement may not always be assured.

It has likewise been suggested to mount the sensor on one of the measuring feelers of a self-calibrating system, said feelers being in direct contact with the workpiece. However, this contact is very localized if one wishes to measure precisely the diameter of the workpiece, from whence it follows that the feelers transmit poorly the noise which is sought to be detected. Furthermore, on certain machines provided with a self-calibrating system, the setting of said feelers is delayed in order to prevent their wear. It is thus not certain that such feelers are in contact with the workpiece at the moment of contact of the tool part.

SUMMARY OF THE INVENTION

To avoid the difficulties hereinabove cited, this invention provides a sensor fixed to a feeler fastened onto the framework of the machine by means of elastic shockabsorbing elements, said feeler being arranged so as to be in contact with the workpiece or the carrier of said workpiece.

DESCRIPTION OF THE PREFERRED EMBODIMENT

Figure 1:
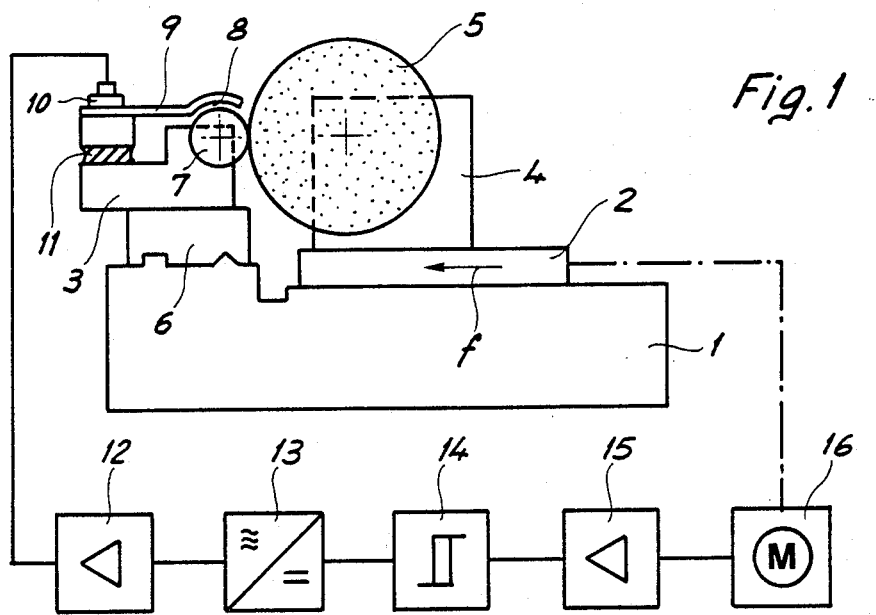
FIG. 1 comprises a simplified schematic of a grinder-truer on which is mounted the arrangement in accordance with the invention.

There is shown on FIG. 1 the framework of a grindertruer. This framework supports a first carriage 2 displaceable in translation according to arrow f by means of a driving motor 16. Carriage 2 includes a tool support 4 on which is mounted a grinding wheel 5 for rotation about a horizontal axis.

Framework 1 supports likewise a second carriage 6 displaceable in translation in a direction perpendicular to the plane of the figure, and this carriage bears a support 3 for a workpiece 7. According to the invention, a feeler 9 in contact with the workpiece 7 is mounted on the framework of the machine by means of elastic shockabsorbing elements 11. The contact may be direct or indirect, as shown on FIG. 1. Here an interface 8 is interposed between feeler 9 and the workpiece 7. The interface 8 constitutes a secondary characteristic of the invention and will be further described hereinafter. The feeler is provided with a sensor 10 which is rigidly fastened thereto. The sensor 10 is capable of detecting acoustic energy in the feeler 9 constituted by vibrations. Piezoelectric sensors manufactured for instance by the German company Endevco may be employed.

When the grinding wheel 5 comes into contact with the workpiece 7, the feeler 9 transmits to sensor 10 an acoustic signal representative of this contact and which is transformed by the sensor into an electrical signal. This electrical signal is transmitted to an electronic processing circuit which includes an amplifier 12, a rectifier 13 and a comparator 14. The comparator compares the output signal of the rectifier with a reference signal and if the output signal is greater than the reference signal, the comparator emits a signal which controls in turn a power circuit 15 which assures the control of the motor 16 and in particular serves to reduce the speed thereof. This type of servo system is known and has already been described in the patents cited hereinabove. There is thus no need to go further into details here.

Essentially, the invention consists of putting into operation a feeler 9 which is connected with the workpiece and which transmits the noise or vibrations generated by the contact of the grinder 5 with said workpiece and in insulating said feeler 9 from the framework of the machine by means of a shock-absorber 11, this preventing ambient noises from reaching the feeler and consequently the sensor 10 which is fixed thereto. Thus the noise generated by the coming into contact of the tool with the workpiece follows a direct route between the source of the noise and the feeler-sensor without the necessity of passing through bearings or rollers as has been the case when the sensor was fixed onto the framework of the machine or the carriage supporting the workpiece. The invention likewise enables measurement which is effected at almost immediate proximity to the noise source, this being advantageous for rejecting ambient noises from a base noise of small amplitude.

There will now be examined two particular embodiments which come within the framework of the present invention and for which the same reference numerals are employed for designating elements having the same functions as those described with reference to FIG. 1.

Figure 2:
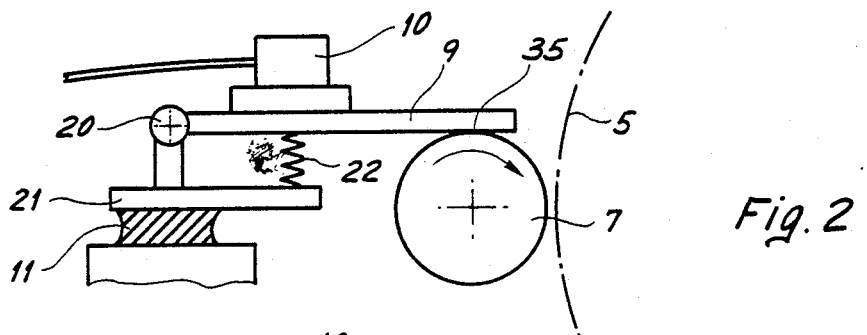
FIG. 2 is a schematic drawing of a cross-section on a first embodiment of the invention.

The first embodiment is shown on FIG. 2 where there will be recognized the grinder 5, the workpiece 7, the feeler 9, the sensor 10 and the shock-absorbing element 11. Here the feeler 9 is in contact with the workpiece 7 at location 35. Fixed to this feeler there will be found the noise sensor 10. The feeler is hinged at 20 onto a support 21, itself fixed to the framework of the machine through elastic element 11. The bearing force of feeler 9 on workpiece 7 may be regulated by a return spring 22. In the case shown on FIG. 2, the contact is direct between the workpiece and the feeler.

Should one employ a cooling liquid for the grinding operation, the piece 7 will be surrounded by an interface constituted by this liquid between the feeler 9 and said workpiece 7. Since this liquid is an excellent noise conductor, the impact signal when the grinder contacts the workpiece will be likewise transmitted to the sensor. The employment of this liquid in addition to being justified for the machining operation is advantageous for the arrangement of the invention. Effectively, it avoids wear of the feeler, strongly minimizes the frictional noise and finally increases the support surface, this being favourable for a good transmission of the noise.

In an arrangement where there is no cooling liquid, at least in the region where the feeler is located, one may create an interface between the feeler and the workpiece by coating the feeler with an anti-friction metal, for instance.

Figure 3:
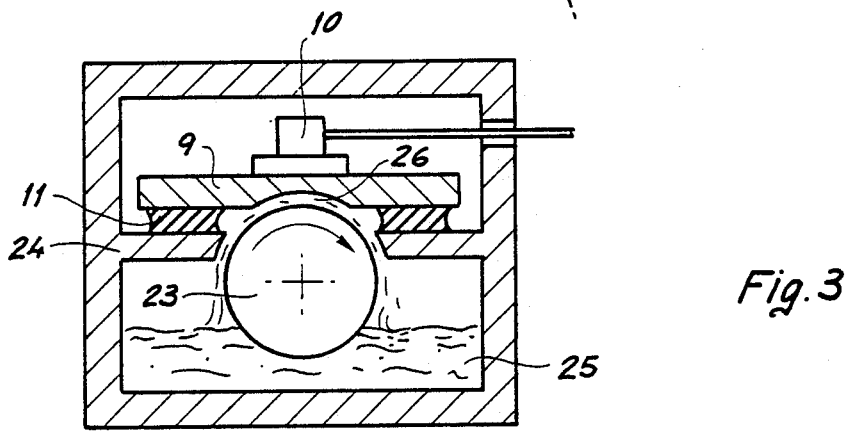
FIG. 3 is a schematic drawing of a cross-section of a second embodiment of the invention.

FIG. 3 is a schematic drawing of a cross-section of a second embodiment of the invention. Here the feeler 9 is in contact not with the workpiece, but with the carrier 23 of said workpiece. This arrangement has the advantage of a more universal system since the feeler does not have to be adapted each time to the dimensions of the workpiece.

In this arrangement the feeler 9 to which is fixed the acoustic sensor 10 is fastened to the framework 24 surrounding the workpiece carrier 23 by means of shock-absorbing elements 11. In rotating, the workpiece carrier 23 draws around itself the lubricating oil 25 of the bearings (not shown). There is thus an acoustic contact between the workpiece carrier 23 and the feeler 9 through a film of oil located at 26. As in the preceding embodiment, the shock absorbers 11 prevent ambient noises from being transmitted to the feeler and from there to the noise sensor. The noise of impact between the workpiece and the tool is initially transmitted to the workpiece, then to the carrier through a chuck (not shown) and finally to the feeler through film 26.

Figure 4:
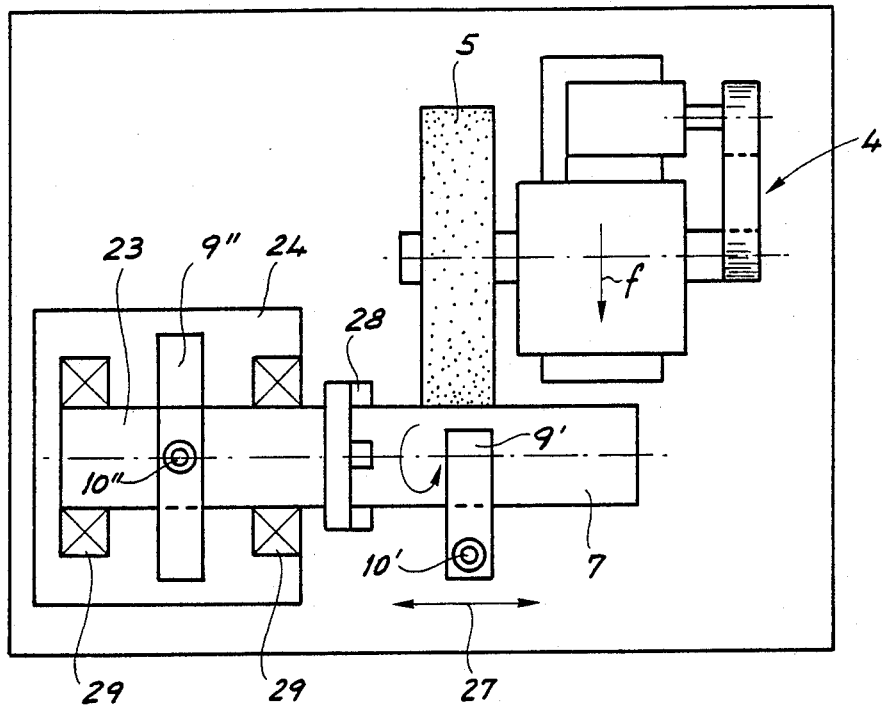
FIG. 4 is a top view of the machine equipped with the arrangement of the invention according to one or the other of the embodiments shown on FIGS. 2 and 3 respectively.

FIG. 4 is a top view of the machine equipped with an arrangement according to one or the other embodiments previously discussed. It comprises a schematic drawing showing the general principle of the arrangement according to the invention. There will be recognized grinding wheel 5, grinder support 4 containing the driving means for the grinding wheel as well as the means for displacing said grinding wheel according to the sense of arrow f. The workpiece 7 is fixed to a carrier 23 by means of chuck 28. The carrier turns in bearings 29 and the assembly is enclosed in a framework 24. Framework 24 and workpiece 7 may move in the sense of arrow 27. According to the first embodiment, the feeler and the sensor are situated at 9' and 10' respectively. According to the second embodiment, the feeler and the sensor are found respectively at 9" and 10".

Figure 5:
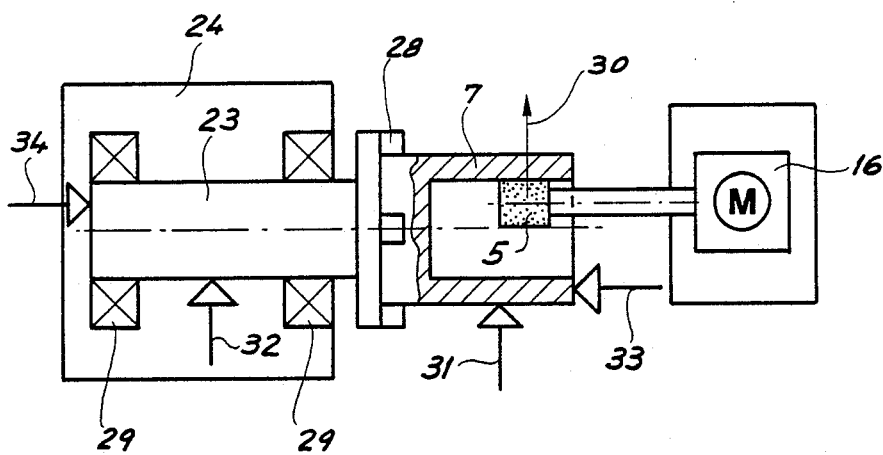
FIG. 5 is likewise a top view of the machine where the arrangement in accordance with these two embodiments is applied to a special type of workpiece.

FIG. 5 shows schematically an internal circular grinding adapted to machine. Thus, in workpiece 7, there may penetrate a grinding wheel 5 driven in rotation by a motor. Once in position, the wheel 5 may rapidly approach piece 7 in the sense of arrow 30 until contact has been established. At this movement, the approach speed is reduced. The speed of advance of the wheel in the sense of arrow 30 is regulated by a motor 16, itself controlled by the arrangement according to the invention. The workpiece 7 is driven in rotation by the carrier 23 turning in bearings 29. According to the embodiments described, the feeler may be applied either at 31 or 32. As a variant, one could apply the feeler to the end 33 of the workpiece, or the end 34 of the workpiece carrier.

In order that the ambient noises originating from the machine do not arrive at the feeler, the elastic shockabsorbing elements support the feeler. These elements may be buffers of elastic material, the ends of which are supported respectively on the machine framework and on the feeler. The buffers which are currently sold under the name of silent-blocks are well suited to this employment.

What I claim is:

1. An arrangement for controlling the speed of advance of the tool part of a machine tool during its approach phase toward a workpiece and for reducing said speed as soon as the tool part has come into contact with the workpiece, said contact of said tool with said workpiece causing generation of a signal, said arrangement comprising an acoustic sensor adapted to detect said signal emitted at the instant of said contact, an electronic circuit for processing said signal and a motor responding to the circuit so as to regulate the speed of advance of said tool part, said sensor being fastened to a feeler mounted on the machine framework by means of elastic shock absorbing elements disposed between said feeler and said machine framework, said feeler being arranged to be in contact with the workpiece or the carrier of said workpiece.

2. An arrangement as set forth in claim 1 in which the elastic shock absorbing elements comprise buffers of elastic material the ends of which are supported respectively on the machine framework and the feeler.

3. An arrangement as set forth in claim 1 wherein the feeler is in direct mechanical contact with the workpiece.

4. An arrangement as set forth in claim 1 wherein the feeler is in indirect mechanical contact with the workpiece or the carrier of said workpiece, there being an interface interposed between said feeler and said workpiece or said carrier.

5. An arrangement as set forth in claim 4 wherein the interface comprises a cooling liquid employed during machining of the workpiece, the feeler being in contact with said workpiece through said liquid.

6. An arrangement as set forth in claim 4 wherein the interface comprises oil used for lubrication of the carrier, the feeler being in contact with said carrier through said oil.

* * * * *